(12) United States Patent
Miyamoto et al.

(10) Patent No.: US 7,573,167 B2
(45) Date of Patent: Aug. 11, 2009

(54) GEARED MOTOR

(75) Inventors: Katsuki Miyamoto, Nagano (JP);
Shinichi Yoshikawa, Nagano (JP); Akio Ishimizu, Nagano (JP)

(73) Assignee: Nidec Sankyo Corporation (JP)

( * ) Notice: Subject to any disclaimer, the term of this patent is extended or adjusted under 35 U.S.C. 154(b) by 182 days.

(21) Appl. No.: 11/834,265

(22) Filed: Aug. 6, 2007

(65) Prior Publication Data
US 2008/0036316 A1 Feb. 14, 2008

(51) Int. Cl.
*H02K 49/00* (2006.01)
(52) U.S. Cl. .................................. 310/99; 310/75 R
(58) Field of Classification Search ............... 310/68 B, 310/68 R, 75 R, 98, 99
See application file for complete search history.

(56) References Cited
U.S. PATENT DOCUMENTS

| | | | |
|---|---|---|---|
| 5,770,902 A * | 6/1998 | Batten et al. ................. 310/71 |
| 5,937,507 A * | 8/1999 | Asakura et al. ............... 29/596 |
| 6,577,030 B2 * | 6/2003 | Tominaga et al. .......... 310/68 B |
| 6,707,188 B2 * | 3/2004 | Torii et al. ................. 310/75 R |
| 7,291,951 B2 * | 11/2007 | Takiguchi et al. .......... 310/75 R |
| 7,298,061 B2 * | 11/2007 | Kyoden ..................... 310/68 R |
| 7,394,176 B2 * | 7/2008 | Guttenberger ............. 310/68 R |

FOREIGN PATENT DOCUMENTS

JP  2-124348  10/1990

* cited by examiner

*Primary Examiner*—Thanh-Tam T Le
(74) *Attorney, Agent, or Firm*—Cantor Colburn LLP

(57) ABSTRACT

A geared motor may include a connector, a motor, a deceleration mechanism, an output shaft and a circuit board. The output shaft may include a rotation transmitted part driven by the deceleration mechanism, an external connection part which is disposed apart from the rotation transmitted to be connected with an external member, and a small diameter part formed between the rotation transmitted part and the external connection part. A part of the circuit board is disposed in a space between the rotation transmitted part and the external connection part, and an insertion opening of the connector is opened in a direction that the rotation transmitted part is disposed with respect to the external connection part.

14 Claims, 9 Drawing Sheets

PRIOR ART

GEARED MOTOR

CROSS REFERENCE TO RELATED APPLICATION

The present invention claims priority under 35 U.S.C. § 119 to Japanese Application No. 2006-216301 filed Aug. 8, 2006, which is incorporated herein by reference.

FIELD OF THE INVENTION

An embodiment of the present invention may relate to a geared motor which is provided with a motor rotated by electric power and a deceleration mechanism for decelerating rotation of the motor.

BACKGROUND OF THE INVENTION

As a conventional geared motor, a motor type actuator has been known which includes a female connector with an insertion opening into which an external male connector is inserted, a motor which is rotated by electric power supplied from outside through the female connector, a deceleration mechanism which decelerates rotation of the motor, an output shaft which rotates an external member by transmitting rotation of the deceleration mechanism, and a printed circuit board which electrically connects the female connector with the motor (see, for example, Japanese Utility Model Laid-Open No. Hei 02-124348). In this motor type actuator, the output shaft is provided with an internal gear to which rotation of the deceleration mechanism is transmitted and an external connection part which is disposed apart from the internal gear in an axial direction of the output shaft to be connected with an external member. The printed circuit board is disposed to the internal gear in a direction that the internal gear is disposed to the external connection part, and the insertion opening of the female connector is opened in a direction that the external connection part is disposed to the internal gear.

However, in the conventional geared motor, as shown in FIG. 10(a) and FIG. 10(b), an insertion opening 220a of a female connector 220 is opened in a direction that an external connection part is disposed to an internal gear and thus, in a state that the external connection part has been connected with an external member 320, the external member 320 becomes an obstacle and inserting/drawing of a male connector 310 into/from the female connector 220 is not performed easily.

On the contrary, it is conceivable to structure that an insertion opening of a female connector is opened in a direction that an internal gear is disposed to an external connection part and, even in a state that an external connection part has been connected with an external member, inserting/drawing of a male connector into/from the female connector is easily performed. However, in this case, the female connector protrudes on an opposite side to a side where the external connection part is disposed unless a position of a printed circuit board is changed in an axial direction of an output shaft. Therefore, the size of the entire product increases in the axial direction of the output shaft by protruded amount of the female connector.

On the other hand, even when a position of the printed circuit board in the axial direction of the output shaft is changed to an outer peripheral position of the output shaft, a size of the printed circuit board is increased since the printed circuit board is required to avoid the output shaft. Therefore, the size of the entire product increases in a direction perpendicular to the axial direction of the output shaft.

SUMMARY OF THE INVENTION

In view of the problems described above, an embodiment of the present invention may advantageously provide a geared motor in which inserting/drawing of an external connector is capable of being easily performed even in a state when an external member has been connected while the size of an entire product is restrained.

Thus, according to an embodiment of the present invention, there may be provided a geared motor including a connector which is formed with an insertion opening into which an external connector is inserted, a motor which is rotated by electric power supplied from outside through the connector, a deceleration mechanism for decelerating rotation of the motor, an output shaft to which rotation of the deceleration mechanism is transmitted to rotate an external member, and a circuit board for electrically connecting the connector with the motor. In the geared motor, the output shaft includes a rotation transmitted part to which the rotation of the deceleration mechanism is transmitted, an external connection part which is disposed apart from the rotation transmitted part in an axial direction of the output shaft and which is to be connected with the external member, and a small diameter part which connects the rotation transmitted part with the external connection part and which is formed to have a smaller diameter than the rotation transmitted part and the external connection part. A part of the circuit board is disposed in a space between the rotation transmitted part and the external connection part, and the insertion opening is opened in a direction that the rotation transmitted part is disposed to the external connection part. Specifically, the circuit board is disposed between the rotation transmitted part and the external connection part, and the connector is disposed on the rotation transmitted part side of the circuit board and the insertion opening is opened in a direction that the rotation transmitted part is disposed to the external connection part.

According to the structure as described above, in the geared motor in accordance an embodiment of the present invention, the insertion opening of the connector is opened in the direction that the rotation transmitted part is disposed to the external connection part. Therefore, even in the state that the external connection part has been connected with an external member, inserting/drawing of the external connector into/from the connector is not disturbed by the external member and thus inserting/drawing of the external connector into/from the connector can be easily performed. Further, in the geared motor in accordance an embodiment of the present invention, the circuit board is disposed with respect to the rotation transmitted part in the direction that the external connection part is disposed to the rotation transmitted part. Therefore, the connector can be restrained from protruding in the direction that the rotation transmitted part is disposed to the external connection part in comparison with a structure that the circuit board is disposed with respect to the rotation transmitted part in a direction that the rotation transmitted part is disposed to the external connection part. Therefore, the size of the entire product can be restrained in the axial direction of the output shaft. Further, in the geared motor in accordance an embodiment of the present invention, a part of the circuit board is disposed in a space between the rotation transmitted part and the external connection part. Therefore, the circuit board can be restrained to be made larger in comparison with a structure that the circuit board avoids the rotation transmitted part and the external connection part and thus the size of the entire product can be restrained in the direction perpendicular to the axial direction of the output shaft.

Further, the external connection part of the geared motor in accordance with an embodiment of the present invention may be provided with a recessed part which is to be engaged and connected with a protruded part that is formed in the external member.

According to the structure as described above, in the geared motor in accordance with an embodiment of the present invention, a diameter of the external connection part is required to be larger than a diameter of the protruded part of the external member. Therefore, the geared motor has a larger effect of restraining the size of the entire product by disposing a part of the circuit board in the space formed between the rotation transmitted part and the external connection part, and thus the size of the entire product can be restrained in the direction perpendicular to the axial direction of the output shaft.

Further, the geared motor in accordance with an embodiment of the present invention is provided with a rotational position sensor which includes a shaft mounted part mounted on the output shaft and a circuit board mounted part mounted on the circuit board for detecting a rotational position of the output shaft to the circuit board on the basis of a position of the shaft mounted part to the circuit board mounted part, and the rotational position sensor is disposed in the space which is formed by providing the small diameter part between the rotation transmitted part and the external connection part.

According to the structure as described above, in the geared motor in accordance with an embodiment of the present invention, the rotational position sensor is disposed in the space which is formed by providing the small diameter part between the rotation transmitted part and the external connection part. Therefore, the size of the entire product can be restrained in the direction perpendicular to the axial direction of the output shaft in comparison with a structure that the rotational position sensor is disposed on an outer side of the space which is formed by providing the small diameter part between the rotation transmitted part and the external connection part. Specifically, the circuit board is extended to a position of the small diameter part and the rotational position sensor is structured between opposite faces of the circuit board and the output shaft and, in this case, the size of the entire product can be restrained.

Further, the geared motor in accordance with an embodiment of the present invention is provided with a rotational position sensor which includes a shaft mounted part mounted on the output shaft and a circuit board mounted part mounted on the circuit board for detecting a rotational position of the output shaft to the circuit board on the basis of a position of the shaft mounted part to the circuit board mounted part. In the geared motor, the connector is provided with terminals in the insertion opening and the circuit board electrically connects the terminals with the rotational position sensor and, in addition, a face of the circuit board to which the terminals are electrically connected and a face of the circuit board to which the circuit board mounted part is electrically connected are the same face. In this case, the shaft mounted part may be one of a brush, a magnet, a protruded part formed on the output shaft, and a light blocking plate, and the circuit board mounted part is one of a sensor pattern, a Hall IC, a leaf switch, and a photo-interrupter which is disposed corresponding to the one of the brush, the magnet, the protruded part formed on the output shaft, and the light blocking plate.

According to the structure as described above, in the geared motor in accordance with an embodiment of the present invention, a single-side circuit board can be used as the circuit board and thus manufacturing cost can be reduced in comparison with a case that a double-side circuit board is used.

Further, in the geared motor in accordance with an embodiment of the present invention, the shaft mounted part is a brush which is urged on the circuit board mounted part side to abut with the circuit board mounted part and is electrically connected with the circuit board mounted part. In addition, the deceleration mechanism includes a fixed gear part which is fixed to the circuit board, and the fixed gear part is provided with a bending preventing part for restraining the circuit board to be bent in a direction that the circuit board is disposed to the brush, and the bending preventing part is disposed with respect to the circuit board on a side where the circuit board is disposed to the brush in a state that the bending preventing part contacts with the circuit board or the bending preventing part will be contacted with the circuit board, when the circuit board is bended, to prevent further bending of the circuit board.

According to the structure as described above, in the geared motor in accordance with an embodiment of the present invention, bending of the circuit board in a direction that the circuit board is disposed to the brush is restrained by the bending preventing part. Therefore, the circuit board is prevented from being bent by an urging force of the brush to be damaged or to cause a contact condition between the brush and the circuit board mounted part to be unstable. Specifically, the geared motor may be structured that the deceleration mechanism includes a planet gear mechanism which includes planet gears and a fixed gear part with which the planet gears are engaged, and the fixed gear part is provided with a bending preventing part for restraining the circuit board being bent.

Further, the geared motor in accordance with an embodiment of the present invention is provided with a case which accommodates the output shaft, the motor, the deceleration mechanism and the circuit board. The rotation transmitted part includes a first member and the external connection part includes a second member, and the first member and the second member are assembled to each other in a state that the first member and the second member are movable in the axial direction to each other, and the case is capable of contacting with a part of the second member from a direction that the second member is disposed to the first member.

According to the structure as described above, in the geared motor in accordance with an embodiment of the present invention, when the case is assembled, the second member is prevented from disengaging from the first member and thus assembling of the entire device can be easily performed.

Further, in the geared motor in accordance with an embodiment of the present invention, the deceleration mechanism includes a planet gear mechanism, and a sun gear of the planet gear mechanism and the output shaft are disposed in a coaxial manner.

According to the structure as described above, in the geared motor in accordance with an embodiment of the present invention, an outer shape of the planet gear mechanism is circular, and the sun gear and the output shaft are coaxially disposed and thus the size of the entire product can be restrained in the direction perpendicular to the axial direction of the output shaft.

According to the present invention, the output shaft is divided into the rotation transmitted part and the external connection part so that opposite faces of the rotation transmitted part and the external connection part are disposed apart from each other through the small diameter, and the circuit board is disposed in the space formed between the rotation transmitted part and the external connection part. Therefore, even in the state that the external connection part has been connected with an external member, inserting/drawing of an external connector into/from the connector can be easily performed.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings.

First, a structure of a geared motor in accordance with an embodiment of the present invention will be described below.

Figure 2:
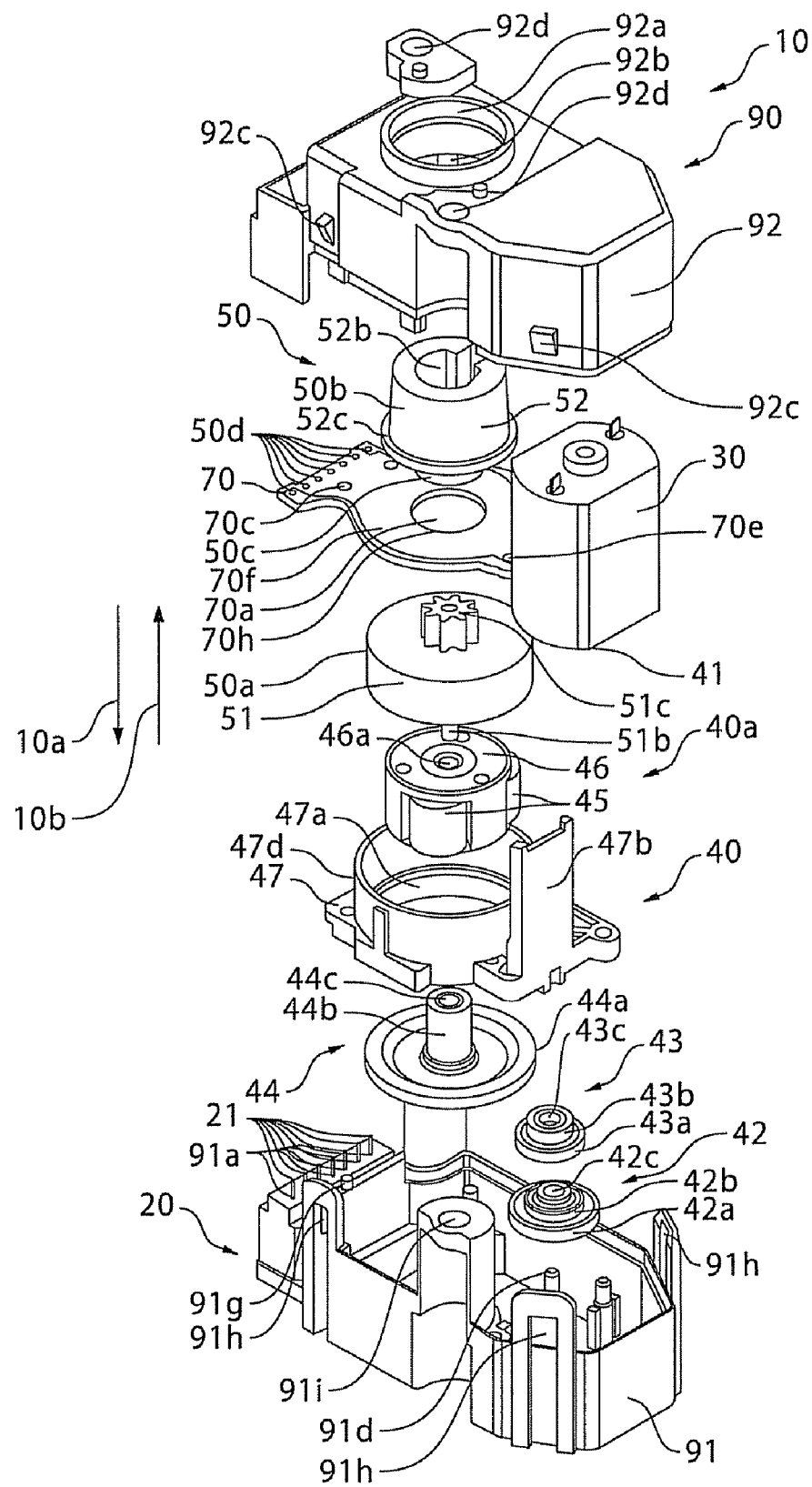
FIG. 2 is an exploded perspective view showing the geared motor shown in FIG. 1 which is viewed from its upper face side.
Figure 3:
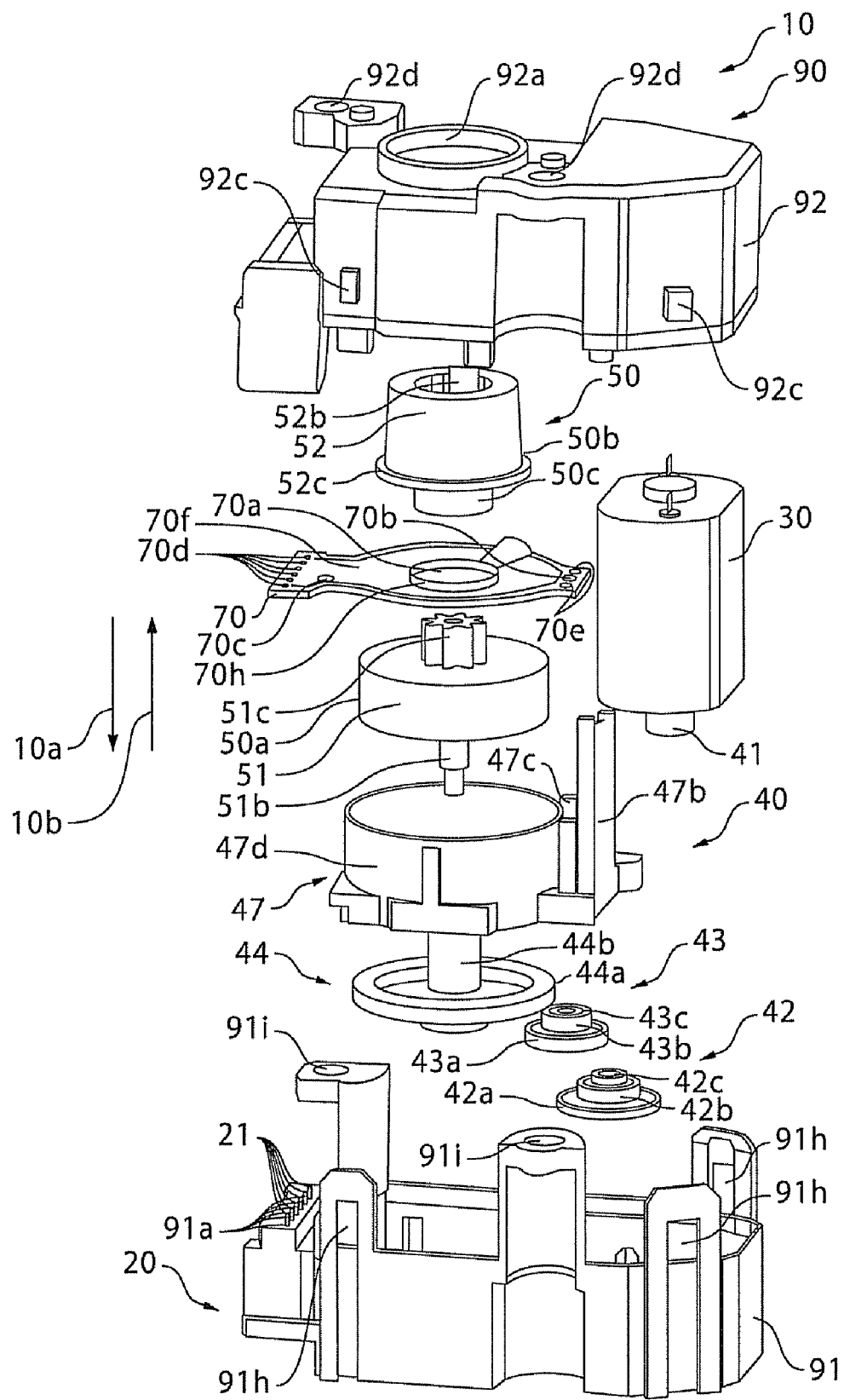
FIG. 3 is an exploded perspective view showing the geared motor shown in FIGS. 1(a) and 1(b) which is viewed from its side face side and in which planetary gears and a carrier are omitted.
Figure 4A:
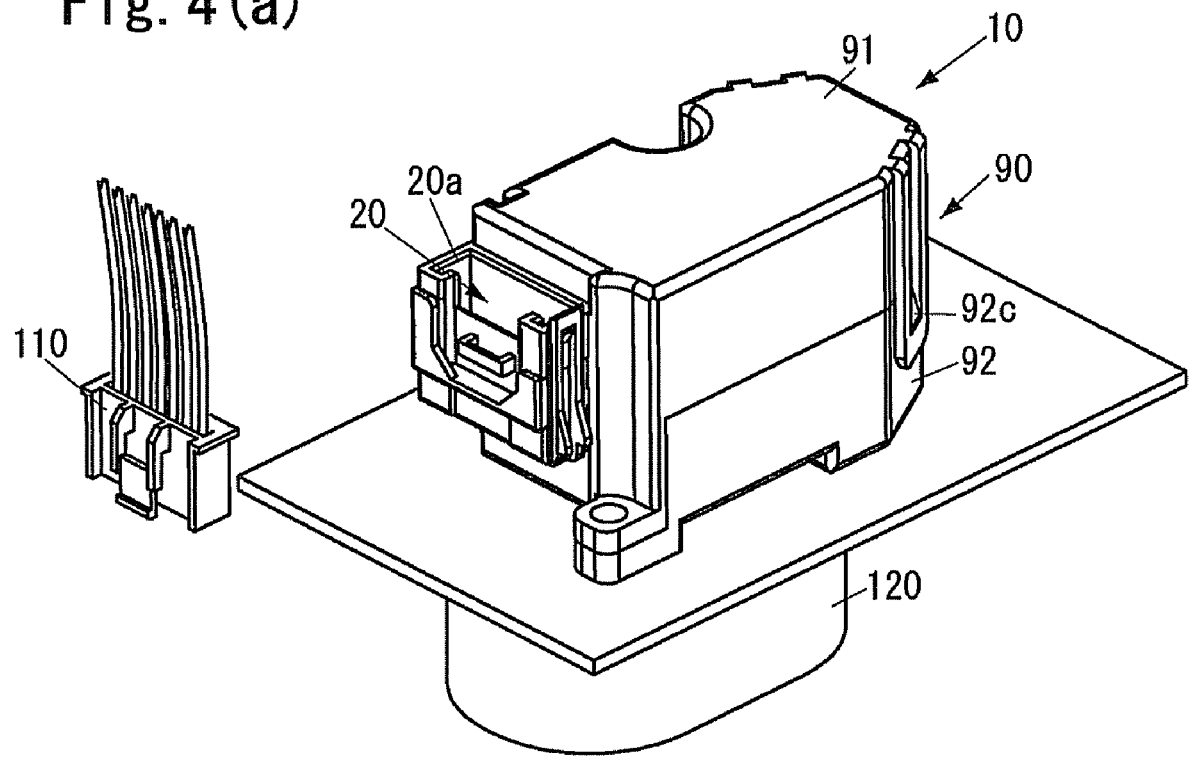
FIG. 4(a) is a perspective outward appearance view showing the geared motor shown in FIGS. 1(a) and 1(b) which is viewed from its bottom face side before an external connector is inserted in a state that an external member has been connected.
Figure 4B:
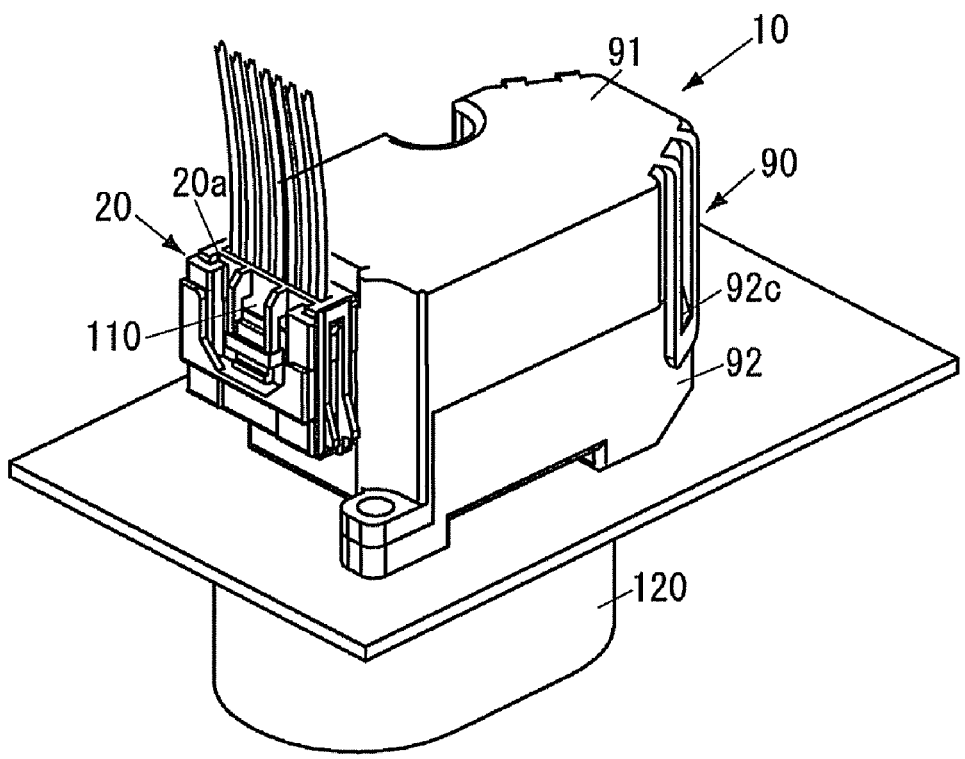
FIG. 4(b) is a perspective outward appearance view showing the geared motor shown in FIGS. 1(a) and 1(b) which is viewed from its bottom face side after the external connector is inserted in a state that the external member has been connected.
Figure 5A:
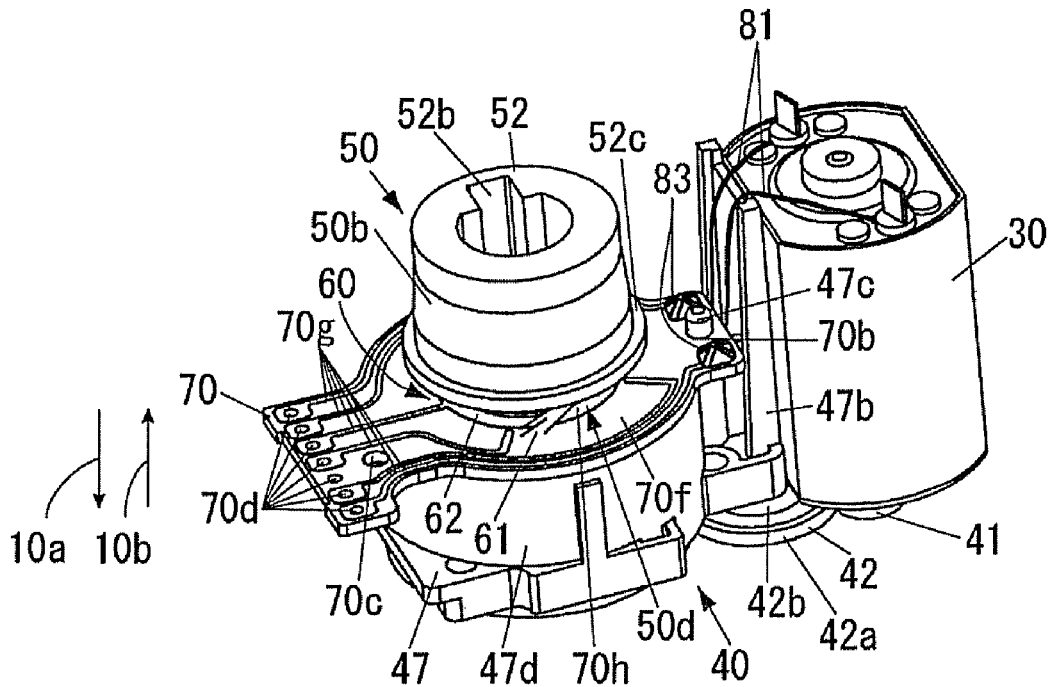
FIG. 5(a) is a perspective view showing the geared motor shown in FIGS. 1(a) and 1(b) which is viewed from its upper face side in which a case is detached.
Figure 5B:
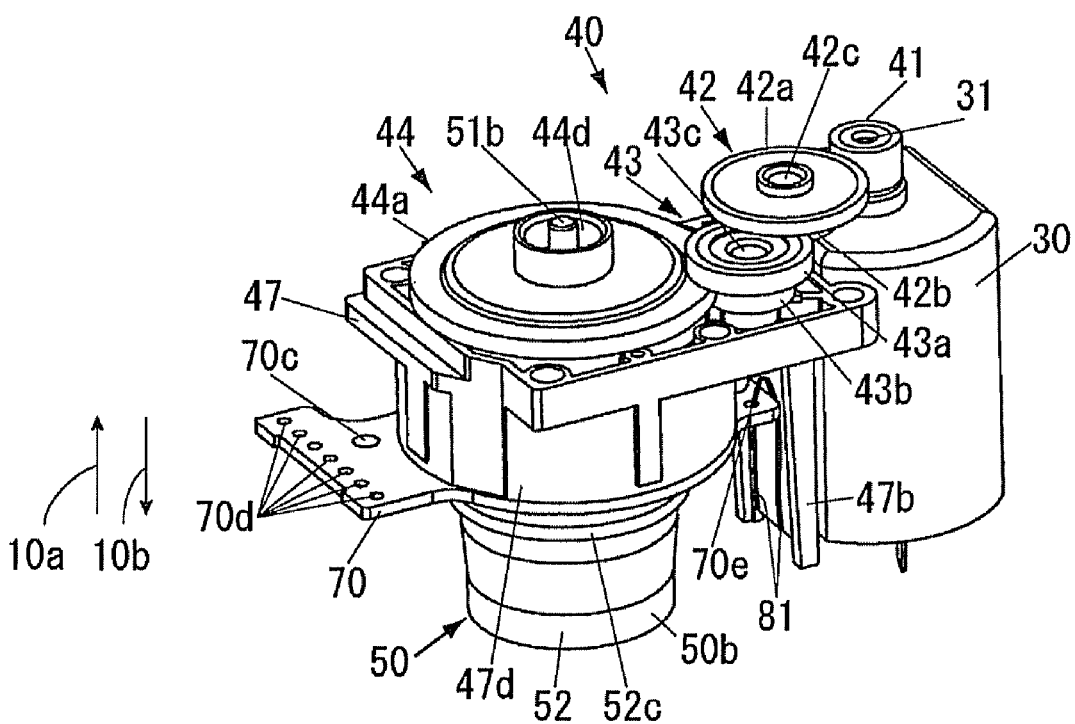
FIG. 5(b) is a perspective view showing the geared motor shown in FIGS. 1(a) and 1(b) which is viewed from its bottom face side in which the case is detached.
Figure 6:
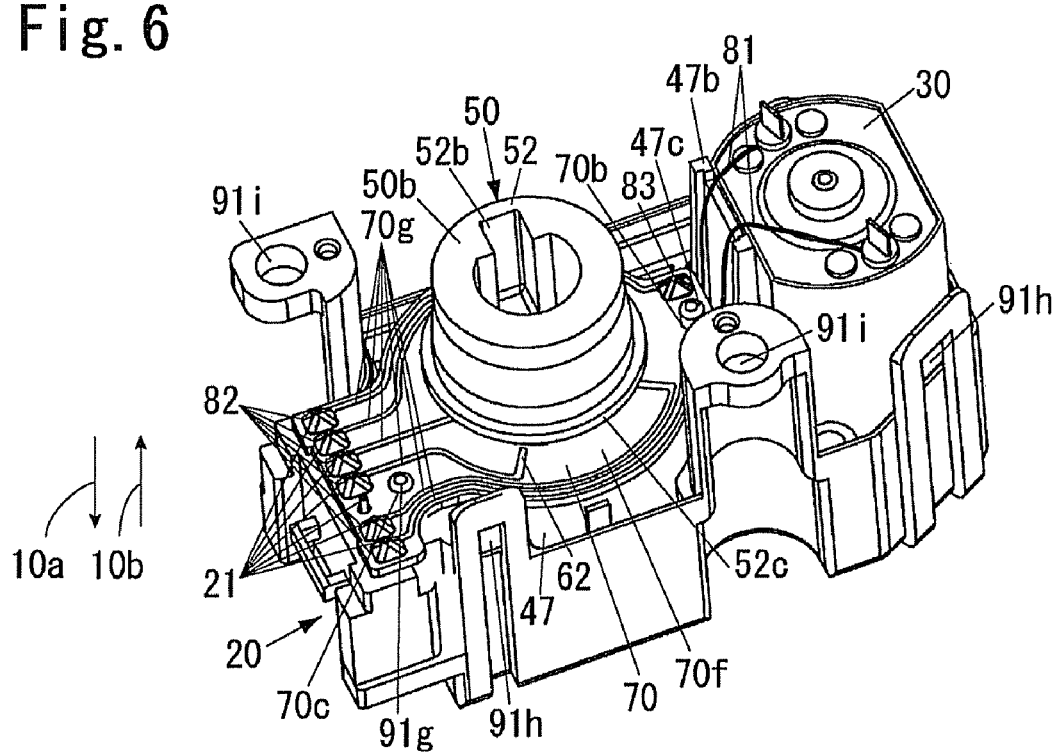
FIG. 6 is a perspective view showing the geared motor shown in FIGS. 1(a) and 1(b) which is viewed from its upper face side in a state that a second case is detached.

As shown in FIG. 1(a) through FIG. 3, a geared motor 10 in accordance with an embodiment of the present invention includes a female connector 20 as a connector which is formed with an insertion opening 20a into which a male connector 110 (see FIGS. 4(a) and 4(b)) that is an external connector is inserted and which is provided with a plurality of terminals 21 in the insertion opening 20a, a motor 30 which is rotated by electric power supplied from outside through the terminals 21, a deceleration mechanism 40 which decelerates rotation of the motor 30, an output shaft 50, a rotational position sensor 60 (see FIG. 5(a)) for detecting a rotational position of the output shaft 50, a circuit board 70 to which the terminals 21 are connected and which electrically connects the terminals 21 to the motor 30 and the rotational position sensor 60, two electric wires 81 (see FIGS. 5(a) and 5(b)) which electrically connect the circuit board 70 to the motor 30, solders 82 (see FIG. 6) which electrically connect the terminals 21 to the circuit board 70, solders 83 (see FIG. 6) which electrically connect the circuit board 70 to the electric wires 81, and a case 90 which surrounds the motor 30, the deceleration mechanism 40, the output shaft 50, the rotational position sensor 60, the circuit board 70 and the like. Rotation of the deceleration mechanism 40 is transmitted to the output shaft 50, which rotates an external member 120 (see FIGS. 4(a) and 4(b)) of an external device such as a valve not shown for changing a mixed state of water and hot water, for example, in a hot-water supply apparatus.

Figure 7:
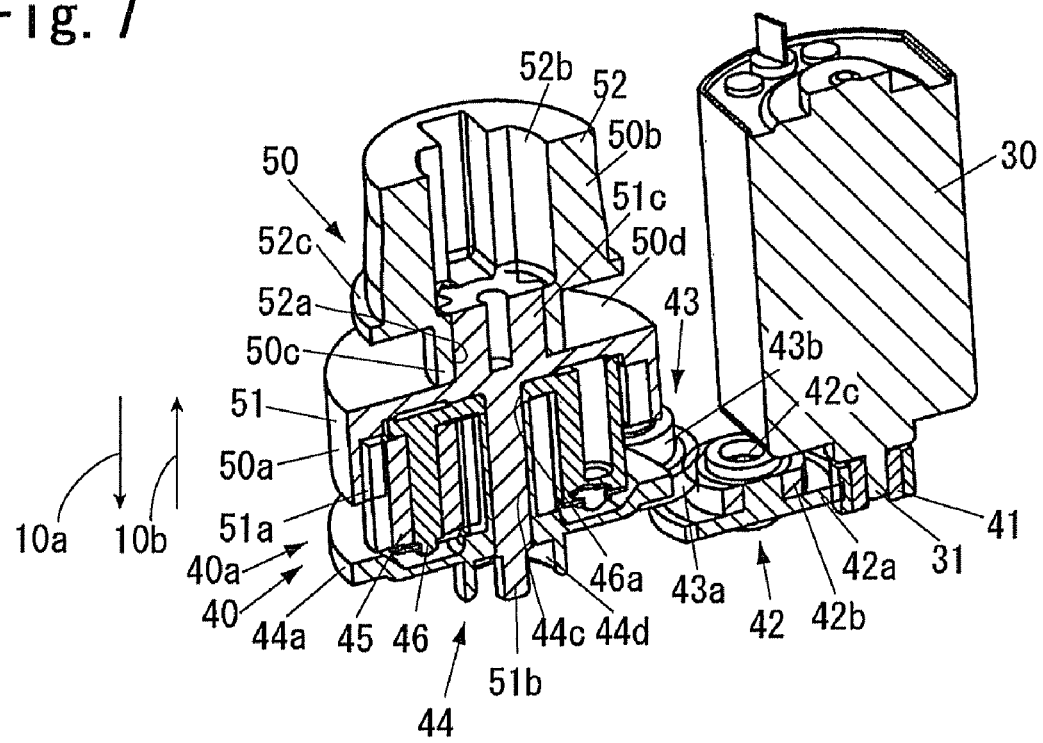
FIG. 7 is a perspective sectional view showing a motor, a deceleration mechanism and an output shaft of the geared motor shown in FIGS. 1(a) and 1(b) which are viewed from their side face side.

As shown in FIG. 7, the motor 30 includes a shaft 31 for transmitting power.

As shown in FIGS. 2 and 3, the deceleration mechanism 40 includes a pinion 41 which is press-fitted to the shaft 31 of the motor 30 (see FIG. 7), a composite gear 42 engaging with the pinion 41, a composite gear 43 engaging with the composite gear 42, a composite gear 44 engaging with the composite gear 43, a plurality of planetary gears 45, and a carrier 46 which has a through-hole 46a in its center and rotatably supports the planetary gears 45, and a fixed gear part 47 which is fixed to the case 90. The composite gear 42 includes a gear 42a engaging with the pinion 41, a pinion 42b which is coaxially disposed on the gear 42a, and a through-hole 42c which is formed in its center. The composite gear 43 includes a gear 43a engaging with the pinion 42b, a pinion 43b which is coaxially disposed on the gear 43a, and a through-hole 43c which is formed in its center. The composite gear 44 includes a gear 44a engaging with the pinion 43b, a sun gear 44b which is coaxially disposed on the gear 44a and is engaged with a plurality of the planetary gears 45, a through-hole 44c which is formed in its center, and a hole 44d (see FIG. 7) which is formed on an opposite side to the sun gear 44b with respect to the gear 44a. The fixed gear part 47 includes an internal gear 47a engaging with the planetary gears 45, a motor support part 47b supporting a side face portion of the motor 30, a projection 47c for fixing the circuit board 70, and a circuit board support part 47d as a bending preventing part which supports the circuit board 70 to prevent bending of the circuit board 70. The sun gear 44*b*, the planetary gears 45, the carrier 46, the internal gear 47*a* structure the planetary gear mechanism 40*a*.

As shown in FIG. 7, the output shaft 50 includes a rotation transmitted part 50*a* to which rotation is transmitted from the deceleration mechanism 40, an external connection part 50*b* which is to be connected to the external member 120 (see FIGS. 4(*a*) and 4(*b*)), and a small diameter part 50*c* which connects the rotation transmitted part 50*a* with the external connection part 50*b* and which is formed to have a smaller diameter than the rotation transmitted part 50*a* and the external connection part 50*b*. The external connection part 50*b* is disposed apart from the rotation transmitted part 50*a* in a direction which is opposite to an opening direction of the insertion opening 20*a* (see FIG. 1(*b*)) in an axial direction of the output shaft 50, in other words, in a direction opposite to the direction shown by the arrow 10*a*, i.e., in a direction shown by the arrow 10*b*. A space 50*d* is formed between the rotation transmitted part 50*a* and the external connecting part 50*b* through the small diameter part 50*c*. The output shaft 50 is structured of a first member 51 which is the rotation transmitted part 50*a* and a second member 52 which is the external connecting part 50*b*. The first member 51 includes the internal gear 51*a* which engages with the planet gears 45 and to which rotation is transmitted from the deceleration mechanism 40, a shaft 51*b* which is penetrated through a through-hole 44*c* of the composite gear 44 and a through-hole 46*a* of the carrier 46 in a state that the composite gear 44 and the carrier 46 are rotatable, and a serrated shaft 51*c* which is disposed on an opposite side to the shaft 51*b*. The second member 52 includes a serrated hole 52*a* to which the serrated shaft 51*c* is fitted, a connecting hole 52*b* as a recessed part for connecting with a protruded part (not shown) which is formed in the external member 120, and a flange 52*c* which is protruded in a direction perpendicular to a direction shown by the arrows 10*a* and 11*b*. The first member 51 and the second member 52 are assembled to each other under a state that they are movable in the axial direction of the output shaft 50 as shown by the arrows 10*a* and 10*b* through the serrated shaft 51*c* and the serrated hole 52*a*.

The connecting hole 52*b* is connected with the protruded part of the external member 120 so as to transmit rotation through "D"-cut or serration engagement.

Figure 8:
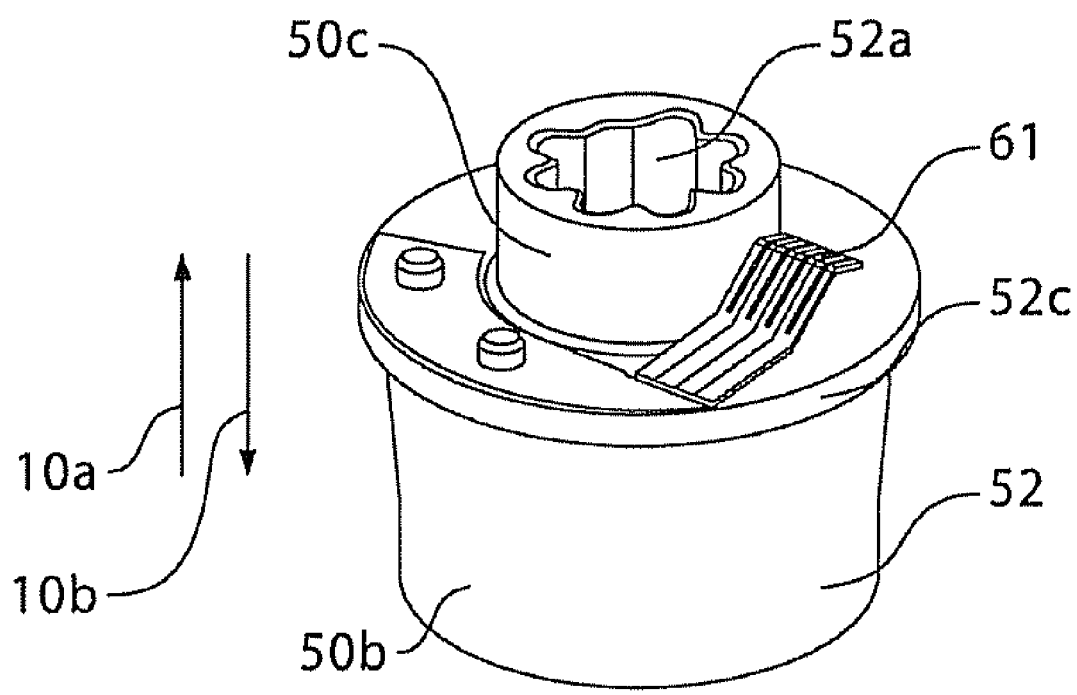
FIG. 8 is a perspective view showing a second member of the output shaft in the geared motor shown in FIGS. 1(a) and 1(b) which is viewed from its bottom face side.

As shown in FIG. 5(*a*), the rotational position sensor 60 includes a brush 61 (see FIG. 8) as a shaft mounted part which is mounted on the second member 52 of the output shaft 50 by thermal welding, and a sensor circuit pattern 62 as a circuit board mounted part which is mounted on the circuit board 70. Rotational position of the output shaft 50 to the circuit board 70 is detected on the basis of the position of the brush 61 to the sensor pattern 62. The rotational position sensor 60 is disposed in the space 50*d* of the output shaft 50. The brush 61 is urged to the sensor pattern 62 side to abut with the sensor circuit pattern 62 and thus the brush 61 can be electrically connected to the sensor circuit pattern 62.

The circuit board 70 is provided with a hole 70*a* (see FIG. 2) into which the small diameter part 50*c* (see FIG. 7) of the output shaft 50 is inserted, a through-hole 70*b* into which the projection 47*c* of the fixed gear part 47 is inserted, a through-hole 70*c* for being fixed to the case 90, through-holes 70*d* into which the terminals 21 (see FIG. 2) are inserted, and through-holes 70*e* into which the electric wires 81 are inserted. In this embodiment, the circuit board 70 is a single-side circuit board on which electric wirings and circuit patterns 70*g* are formed on only one face 70*f* of the circuit board 70. Since the circuit board 70 is a single-side circuit board, all of the terminals 21, the sensor pattern 62 and the electric wires 81 are electrically connected on the face 70*f* of the circuit board 70. Further, a peripheral part 70*h* of the hole 70*a* which is a part of the circuit board 70 is disposed in the space 50*d* of the output shaft 50. The circuit board 70 is disposed in a direction shown by the arrow 10*b* to the circuit board support part 47*d*, which is disposed in a direction where the brush 61 of the rotational position sensor 60 is disposed to the circuit board 70. The circuit board 70 is disposed in a state that it is contacted with the circuit board support part 47*d*.

Figure 9:
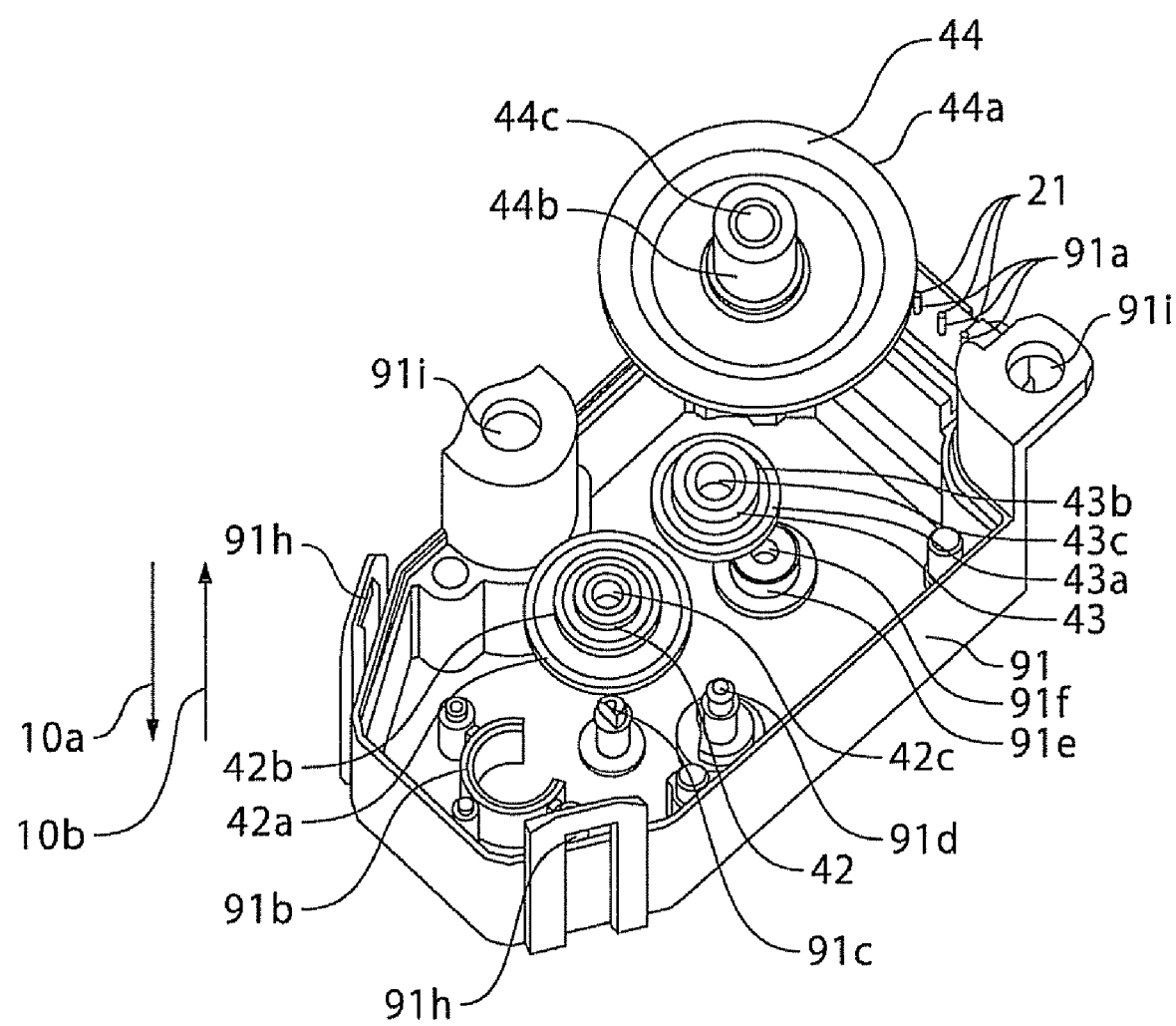
FIG. 9 is an exploded perspective view showing composite gears and a first case of the geared motor shown in FIGS. 1(a) and 1(b) which are viewed from its upper face side.
Figure 10A:
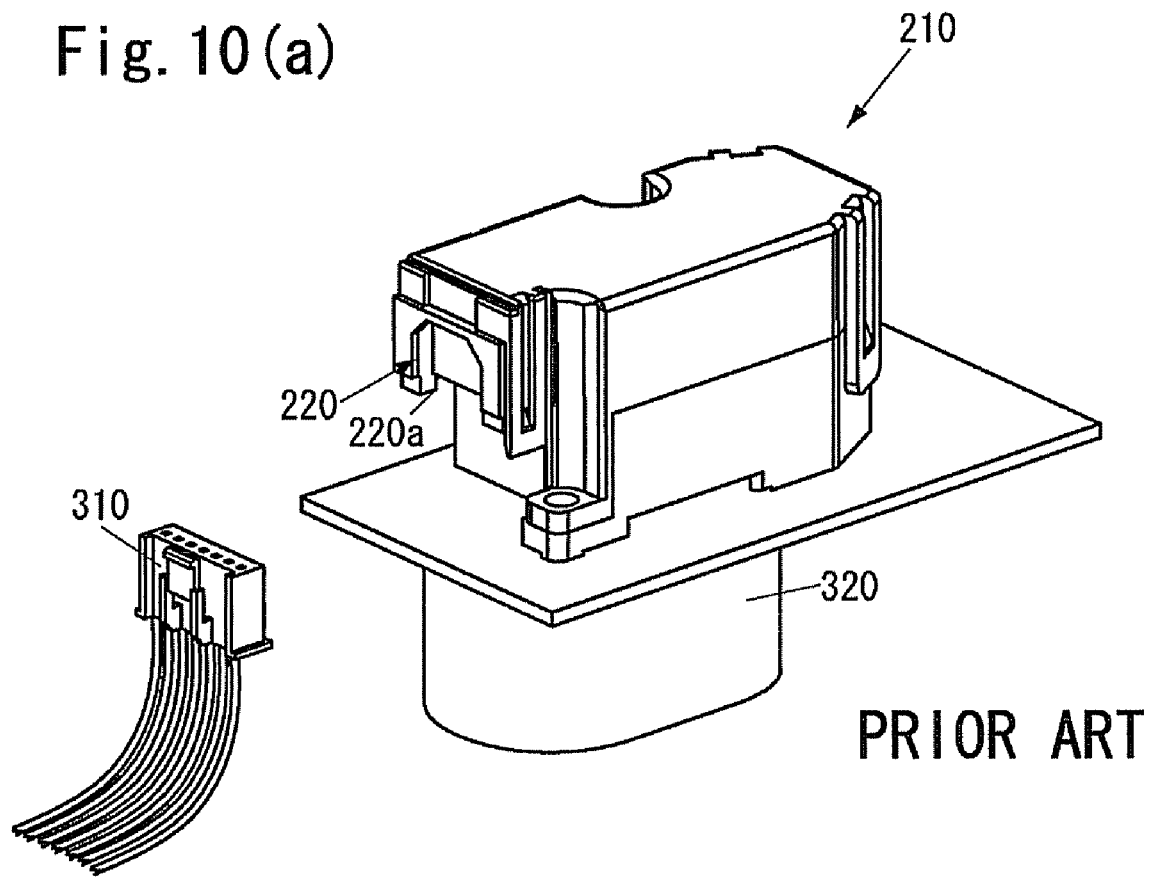
FIG. 10(a) is a perspective outward appearance view showing a conventional geared motor which is viewed from its bottom face side before an external connector is inserted in a state that an external member has been connected.
Figure 10B:
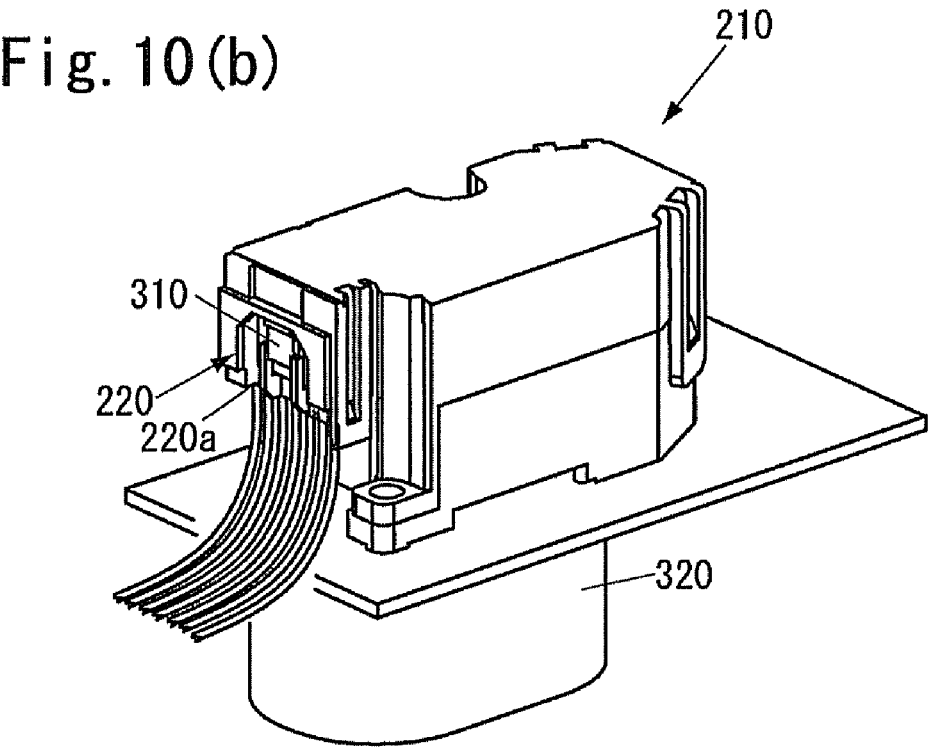
FIG. 10(b) is a perspective outward appearance view showing the conventional geared motor which is viewed from its bottom face side after the external connector is inserted in a state that the external member has been connected.

As shown in FIG. 2, the case 90 includes a first case 91 which is integrally formed with the female connector 20, and a second case 92 which is combined with the first case 91 so as to surround the motor 30, the deceleration mechanism 40, the output shaft 50, the rotational position sensor 60, the circuit board 70 and the like together with the first case 91. As shown in FIG. 9, the first case 91 includes through-holes 91*a* into which the terminals 21 are press-fitted, a protruded part 91*b* which supports the motor 30 (see FIG. 7) so that the pinion 41 (see FIG. 7) does not contact with the first case 91, a shaft 91*c* which is inserted into the through-hole 42*c* of the composite gear 42 to rotatably support the composite gear 42, a shaft 91*d* which is inserted into the through-hole 43*c* of the composite gear 43 to rotatably support the composite gear 43, a shaft 91*e* which is inserted into the hole 44*d* (see FIG. 7) of the composite gear 44 to rotatably support the composite gear 44, a bearing hole 91*f* which is formed at a center of the shaft 91*e* and into which the shaft 51*b* (see FIG. 7) of the output shaft 50 is inserted to rotatably support the output shaft 50, a projection 91*g* which is inserted into the through-hole 70*c* (see FIG. 2) of the circuit board 70 to fix the circuit board 70 to the first case 91, a plurality of holes 91*h* to which the second case 92 (see FIG. 2) is fixed, and a plurality of holes 91*i* to which screws (not shown) for fixing to an external device are inserted. As shown in FIG. 2, the second case 92 includes a bearing hole 92*a* into which the second member 52 of the output shaft 50 is inserted to rotatably support the output shaft 50, a contacting part 92*b* which contacts with the flange 52*c* that is a part of the external connection part 50*b* from a direction shown by the arrow 10*a*, in other words, from a direction that the external connection part 50*b* (see FIG. 7) of the output shaft 50 is disposed to the rotation transmitted part 50*a*, pawls 92*c* which are inserted into holes 91*h* of the first case 91 by snap fitting, and a plurality of holes 92*d* into which screws that are inserted into holes 91*i* of the first case 91 are inserted to fix to an external device.

Next, an operation of the geared motor 10 will be described below.

Figure 1A:
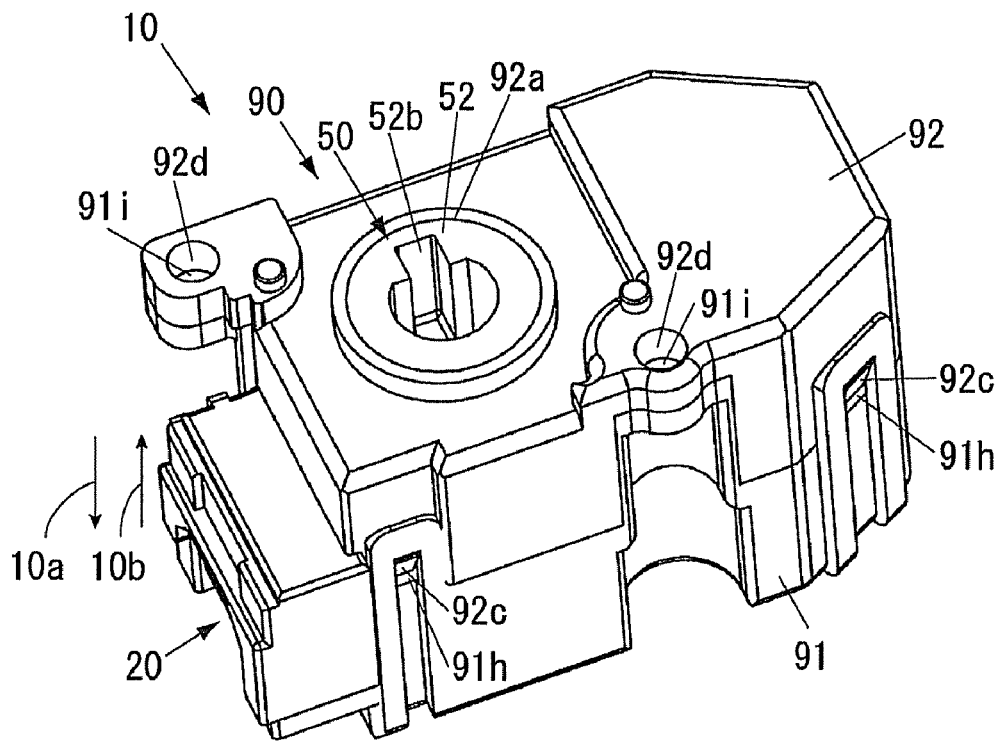
FIG. 1(a) is a perspective outward appearance view showing a geared motor in accordance with an embodiment of the present invention which is viewed from its upper face side.
Figure 1B:
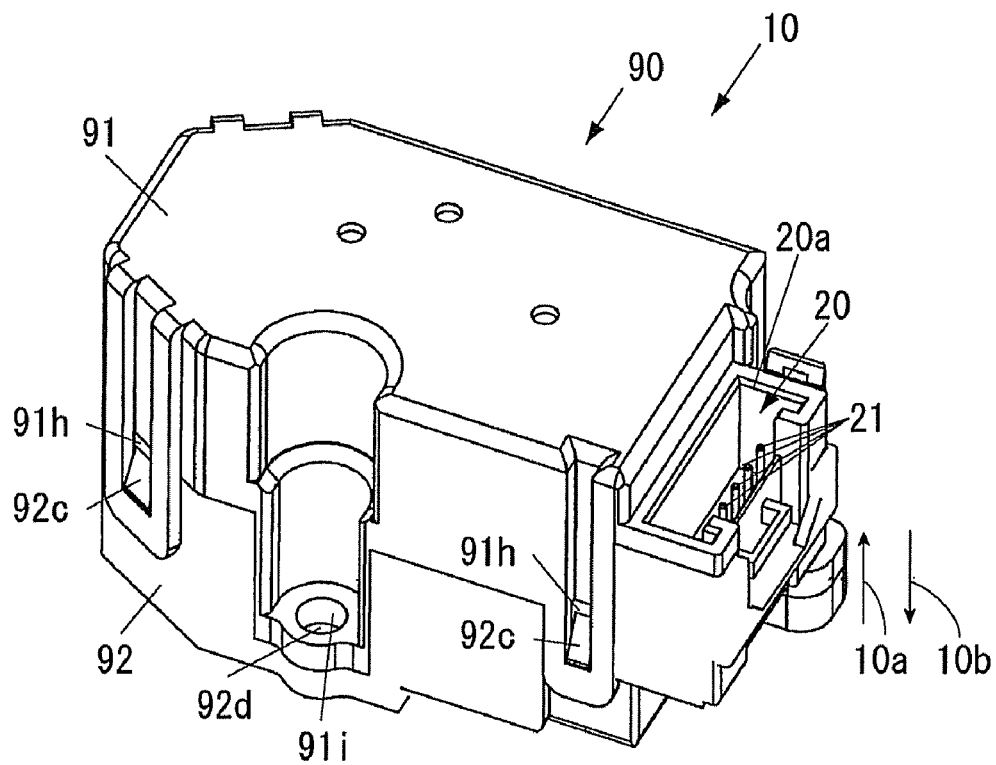
FIG. 1(b) is a perspective outward appearance view showing the geared motor shown in FIG. 1(a) which is viewed from its bottom face side.

As shown in FIG. 2, when electric power is supplied to the motor 30 from the external male connector 110 (see FIGS. 4(*a*) and 4(*b*)), which is inserted into the insertion opening 20*a* of the female connector 20 (see FIG. 1(*b*)), through the terminals 21, the solders 82 (see FIG. 6), the circuit board 70, the solders 83 (see FIG. 6) and the electric wires 81 (see FIG. 6), the shaft 31 (see FIG. 7) of the motor 30 is rotated. Rotation of the shaft 31 of the motor 30 is decelerated through the pinion 41, the composite gear 42 and the composite gear 43 to be transmitted to the gear 44*a* of the composite gear 44. Rotation of the composite gear 44 is decelerated by a planet gear mechanism, which is structured of the sun gear 44*b*, the planet gears 45, the carrier 46 and the internal gear 47*a* of the fixed gear part 47, to be transmitted to the internal gear 51*a* (see FIG. 7) of the output shaft 50 through the planet gears 45. When the output shaft 50 is rotated, an external member 120 (see FIG. 4) which is connected with the external connection part 50*b* of the output shaft 50 is rotated.

When the output shaft 50 is rotated, a rotational position of the output shaft 50 is detected by the rotational position sensor 60 (see FIG. 5). The rotational position which is detected by the rotational position sensor 60 is outputted to the external male connector 110 through the circuit board 70, the solders 82 and the terminals 21 to be used to control electric power that is supplied to the motor 30.

As described above, in the geared motor 10 in accordance with an embodiment of the present invention, the insertion opening 20a of the female connector 20 is opened in a direction that the rotation transmitted part 50a of the output shaft 50 is disposed with respect to the external connection part 50b, i.e., in a direction shown by the arrow 10a. Therefore, even when the external connection part 50b has been connected with the external member 120, inserting/drawing of the male connector 110 into/from the female connector 20 is not disturbed by the external member 120 and thus the inserting/drawing of the external male connector 110 into/from the female connector 20 can be easily performed.

In the geared motor 10 in accordance with an embodiment of the present invention, since the circuit board 70 is disposed in a direction shown by the arrow 10b with respect to the rotation transmitted part 50a of the output shaft 50, the female connector 20 can be restrained from protruding in a direction shown by the arrow 10a in comparison with a structure that the circuit board 70 is disposed in a direction shown by the arrow 10a with respect to the rotation transmitted part 50a. Therefore, the size of the entire product can be restrained in the axial direction of the output shaft 50 shown by the arrows 10a and 10b.

Further, in the geared motor 10 in accordance with an embodiment of the present invention, the peripheral part 70h around the hole 70a of the circuit board 70 is disposed in the space 50d of the output shaft 50. Therefore, the size of the circuit board 70 can be restrained in comparison with a structure that the circuit board 70 is disposed so as to avoid the rotation transmitted part 50a whose size is difficult to reduce because of a relationship with a diameter of the internal gear 51a and further, to avoid the external connection part 50b whose size is difficult to reduce for securing a strength of the external connection part 50b which is connected to the external member 120. As a result, the size of the entire product can be restrained in the direction perpendicular to the axial direction of the output shaft 50 as shown by the arrows 10a and 10b.

Especially, the external connection part 50b in the geared motor 10 is provided with the connecting hole 52b as a recessed part which is engaged and connected with a protruded part (not shown) formed in the external member 120. Therefore, the diameter of the external connection part 50b is required to be larger than the diameter of the protruded part of the external member 120. Accordingly, the geared motor 10 has a larger effect of restraining the size of the entire product by disposing a part of the circuit board 70 in the space 50d which is provided by forming the small diameter part 50c, and thus the size of the entire product can be restrained in the direction perpendicular to the axial direction of the output shaft 50 as shown by the arrows 10a and 10b.

Further, in the geared motor 10 in accordance with an embodiment of the present invention, the sun gear 44b of the planet gear mechanism 40a and the output shaft 50 are disposed in a coaxial manner. Therefore, the outer shape of the planet gear mechanism 40a is circular, and the sun gear 44b and the output shaft 50 are coaxially disposed and, as a result, the size of the entire product can be restrained in the direction perpendicular to the axial direction of the output shaft 50 as shown by the arrows 10a and 10b.

Further, in the geared motor 10 in accordance with an embodiment of the present invention, the rotational position sensor 60 is disposed in the space 50d of the output shaft 50. Therefore, the size of the entire product can be restrained in the direction perpendicular to the axial direction of the output shaft 50 as shown by the arrows 10a and 10b in comparison with a structure that the rotational position sensor 60 is disposed on an outer side of the space 50d of the output shaft 50.

In accordance with an embodiment of the present invention, the rotational position sensor 60 is not limited to the brush 61 and the sensor pattern 62. For example, the rotational position sensor 60 may be structured of a magnet mounted on the output shaft 50 as the shaft mounted part and a Hall IC (Integrated Circuit) mounted on the circuit board 70 as the circuit board mounted part, a protruded part such as a cam shape as the shaft mounted part which is formed on the output shaft 50 and a leaf switch as the circuit board mounted part, or a light blocking plate fixed to the output shaft 50 as the shaft mounted part and a photo-interrupter as the circuit board mounted part.

Further, the circuit board 70 of the geared motor 10 is a single-side circuit board and thus manufacturing cost can be reduced in comparison with a double-side circuit board.

In the geared motor 10 in accordance with an embodiment of the present invention, a face of the circuit board 70 to which the terminals 21 are electrically connected and a face of the circuit board 70 to which the sensor circuit pattern 62 of the rotational position sensor 60 is electrically connected are the same face 70f of the circuit board 70 and thus a single-side circuit board can be used as the circuit board 70 instead of a double-side circuit board. However, a double-side circuit board may be used as the circuit board 70 in which the face of the circuit board 70 to which the terminals 21 are electrically connected is different from the face of the circuit board 70 to which the sensor pattern 62 of the rotational position sensor 60 is electrically connected.

Further, in the geared motor 10 in accordance with an embodiment of the present invention, bending of the circuit board 70 in the direction as shown by the arrow 10a, i.e., in a direction where the circuit board 70 is disposed with respect to the brush 61 is restrained by the circuit board support part 47d of the fixed gear part 47. Therefore, the circuit board 70 is prevented from being bent by an urging force of the brush 61 to be damaged or to cause a contact condition between the brush 61 and the sensor pattern 62 to be unstable.

In accordance with an embodiment of the present invention, the circuit board support part 47d of the fixed gear part 47 is contacted with the circuit board 70 in a state that the circuit board support part 47d is disposed in a direction as shown by the arrow 10a, i.e., in a direction that the circuit board 70 is disposed with respect to the brush 61. However, the circuit board support part 47d of the fixed gear part 47 is not required to contact with the circuit board 70 all the time. The circuit board support part 47d may be disposed to support the circuit board 70 when the circuit board 70 is resiliently bended.

Further, in the geared motor 10 in accordance with an embodiment of the present invention, the first member 51 and the second member 52 of the output shaft 50 are assembled to each other through the serrated shaft 51c and the serrated hole 52a in a state that they are movable in the axial direction as shown by the arrows 10a and 10b. Further, the case 90 is capable of contacting with the flange 52c of the second member 52 from a direction as shown by the arrow 10b, i.e., from a direction that the second member 52 is disposed with respect to the first member 51. Therefore, only when the case 90 is assembled, and the second member 52 is prevented from disengaging from the first member 51 and thus assembling of the entire device can be easily performed.

In accordance with an embodiment of the present invention, the first member 51 and the second member 52 of the output shaft 50 may be assembled to each other through a mechanism other than a serration. For example, the first member 51 and the second member 52 may be assembled to each other by a coupling such as "D"-cut or knurling, which transmits only a rotary force.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A geared motor comprising:
   a connector which is formed with an insertion opening into which an external connector is inserted;
   a motor which is rotated by electric power supplied from outside through the connector;
   a deceleration mechanism for decelerating rotation of the motor;
   an output shaft for rotating an external member to which rotation of the deceleration mechanism is transmitted; and
   a circuit board for electrically connecting the connector with the motor;
   wherein the output shaft comprises;
      a rotation transmitted part to which the rotation of the deceleration mechanism is transmitted;
      an external connection part which is disposed apart from the rotation transmitted part in an axial direction of the output shaft and which is to be connected with the external member; and
      a small diameter part which connects the rotation transmitted part with the external connection part and which is formed to have a smaller diameter than the rotation transmitted part and the external connection part; and
   wherein a part of the circuit board is disposed in a space which is provided by forming the small diameter part between the rotation transmitted part and the external connection part; and
   wherein the insertion opening is opened in a direction that the rotation transmitted part is disposed with respect to the external connection part.

2. The geared motor according to claim 1, wherein the external connection part is provided with a recessed part which is to be engaged and connected with a protruded part of the external member.

3. The geared motor according to claim 1, further comprising a rotational position sensor which includes a shaft mounted part mounted on the output shaft and a circuit board mounted part mounted on the circuit board for detecting a rotational position of the output shaft to the circuit board on a basis of a position of the shaft mounted part to the circuit board mounted part,
   wherein the rotational position sensor is disposed in the space between the rotation transmitted part and the external connection part.

4. The geared motor according to claim 3,
   wherein the shaft mounted part is a brush which is urged on the circuit board mounted part side and is abutted with the circuit board mounted part to electrically connect with the circuit board mounted part,
   wherein the deceleration mechanism includes a fixed gear part which is fixed to the circuit board, and the fixed gear part is provided with a bending preventing part for restraining the circuit board to be bent in a direction that the circuit board is disposed with respect to the brush, and the bending preventing part is disposed with respect to the circuit board on a side where the circuit board is disposed with respect to the brush in a state that the bending preventing part contacts with the circuit board or the bending preventing part is contacted with the circuit board when the circuit board is bended to prevent further bending of the circuit board.

5. The geared motor according to claim 1, further comprising a rotational position sensor which includes a shaft mounted part mounted on the output shaft and a circuit board mounted part mounted on the circuit board for detecting a rotational position of the output shaft to the circuit board on a basis of a position of the shaft mounted part to the circuit board mounted part,
   wherein the connector is provided with terminals in the insertion opening, and the circuit board electrically connects the terminals with the rotational position sensor, and a face of the circuit board to which the terminals are electrically connected and a face of the circuit board to which the circuit board mounted part is electrically connected are the same face of the circuit board.

6. The geared motor according to claim 5,
   wherein the shaft mounted part is a brush which is urged on the circuit board mounted part side and is abutted with the circuit board mounted part to electrically connect with the circuit board mounted part, and
   wherein the deceleration mechanism includes a fixed gear part which is fixed to the circuit board, and the fixed gear part is provided with a bending preventing part for restraining the circuit board to be bent in a direction that the circuit board is disposed with respect to the brush, and the bending preventing part is disposed with respect to the circuit board on a side where the circuit board is disposed with respect to the brush in a state that the bending preventing part contacts with the circuit board or the bending preventing part is contacted with the circuit board when the circuit board is bended to prevent further bending of the circuit board.

7. The geared motor according to claim 1, further comprising a case which surrounds the output shaft, the motor, the deceleration mechanism and the circuit board,
   wherein the rotation transmitted part includes a first member and the external connection part includes a second member, and the first member and the second member are assembled to each other in a state that the first member and the second member are movable in the axial direction to each other, and the case is capable of contacting with a part of the second member from a direction that the second member is disposed with respect to the first member.

8. The geared motor according to claim 1, wherein the deceleration mechanism includes a planet gear mechanism, and a sun gear of the planet gear mechanism and the output shaft are disposed in a coaxial manner.

9. A geared motor comprising:
   a connector which is formed with an insertion opening into which an external connector is inserted;

a motor which is rotated by electric power supplied from outside through the connector;

a deceleration mechanism for decelerating rotation of the motor;

an output shaft for rotating an external member to which rotation of the deceleration mechanism is transmitted; and a circuit board for electrically connecting the connector with the motor;

wherein the output shaft comprises;

a rotation transmitted part to which the rotation of the deceleration mechanism is transmitted;

an external connection part which is disposed apart from the rotation transmitted part in an axial direction of the output shaft and which is to be connected with the external member; and a small diameter part which connects the rotation transmitted part with the external connection part and which is formed to have a smaller diameter than the rotation transmitted part and the external connection part; and wherein the circuit board is disposed between the rotation transmitted part and the external connection part, and the connector is disposed on the rotation transmitted part side of the circuit board, and the insertion opening is opened in a direction that the rotation transmitted part is disposed to the external connection part.

10. The geared motor according to claim 9, further comprising a rotational position sensor for detecting a rotational position of the output shaft to the circuit board, wherein the circuit board is extended to a position of the small diameter part and the rotational position sensor is structured between opposite faces of the circuit board and the output shaft.

11. The geared motor according to claim 10, wherein the deceleration mechanism includes a planet gear mechanism, and the planet gear mechanism includes planet gears and a fixed gear part with which the planet gears are engaged, and the fixed gear part includes a bending preventing part for restraining bending of the circuit board.

12. The geared motor according to claim 11, wherein the rotational position sensor includes a shaft mounted part mounted on the output shaft and a circuit board mounted part mounted on the circuit board, and the shaft mounted part and the circuit board mounted part are disposed between opposite faces of the circuit board and the output shaft.

13. The geared motor according to claim 12, wherein the shaft mounted part is one of a brush, a magnet, a protruded part formed on the output shaft, and a light blocking plate, and the circuit board mounted part is one of a sensor pattern, a Hall IC, a leaf switch, and a photo-interrupter which is disposed corresponding to the one of the brush, the magnet, the protruded part formed on the output shaft, and the light blocking plate.

14. The geared motor according to claim 12, wherein the shaft mounted part is mounted on the external connection part of the output shaft and the circuit board mounted part is mounted on a face on the external connection part side of the circuit board.

* * * * *